(12) United States Patent
Wilson et al.

(10) Patent No.: US 6,701,801 B1
(45) Date of Patent: Mar. 9, 2004

(54) FLAT PROFILE STEERING WHEEL ROTATING DEVICE FOR DRIVER-OPERATED INDUSTRIAL VEHICLES

(75) Inventors: Robert M. Wilson, Albany, OR (US); John L. Hood, Corvallis, OR (US); Tim Strecker, Corvallis, OR (US)

(73) Assignee: Innovative Industrial Products, LLC, Corvallis, OR (US)

( * ) Notice: Subject to any disclaimer, the term of this patent is extended or adjusted under 35 U.S.C. 154(b) by 0 days.

(21) Appl. No.: 10/228,427

(22) Filed: Aug. 27, 2002

Related U.S. Application Data

(63) Continuation of application No. 09/680,081, filed on Oct. 5, 2000, now abandoned.

(51) Int. Cl.[7] ............................. G05G 1/10; B62D 1/12; B62D 1/06
(52) U.S. Cl. ......................... 74/557; 74/552; 292/347; 280/778
(58) Field of Search ................... 280/778; 74/557, 74/552; 384/425, 299; 292/347

(56) References Cited

U.S. PATENT DOCUMENTS

| | | |
|---|---|---|
| 1,784,230 A | 12/1930 | Freeman |
| 1,806,343 A | 5/1931 | Geyer |
| 1,861,586 A | 6/1932 | Shipley |
| 1,936,037 A | 11/1933 | Webb ............................. 74/33 |
| 2,331,588 A | 10/1943 | Woodson ...................... 74/557 |
| 2,441,061 A | 5/1948 | Deer .............................. 74/557 |
| D149,829 S | 6/1948 | Mungen |
| 2,475,858 A | 7/1949 | Riemann ...................... 74/557 |
| 2,482,641 A | 9/1949 | Stites ............................ 74/557 |
| 2,516,532 A | 7/1950 | Sinko ........................... 74/557 |
| 2,561,961 A | 7/1951 | White ........................... 74/557 |
| 2,567,901 A | 9/1951 | Wood ........................... 74/557 |
| 3,776,064 A | 12/1973 | Rose ............................. 74/557 |
| 5,255,573 A * | 10/1993 | Estabrook .................... 74/545 |
| 5,289,736 A | 3/1994 | Fujimori ...................... 74/557 |
| 5,520,071 A | 5/1996 | Jones ............................ 74/557 |
| 2001/0027699 A1 * | 10/2001 | Reicks et al. ................ 74/557 |
| 2002/0007694 A1 | 1/2002 | Moe .............................. 74/557 |

FOREIGN PATENT DOCUMENTS

| | | | | |
|---|---|---|---|---|
| CH | 602403 | | 12/1976 | ............ B62D/1/04 |
| FR | 2704822 | | 5/1993 | ............ B62D/1/06 |
| GB | 2061209 | | 9/1979 | ............ B62D/1/00 |
| WO | WO 96/25300 | * | 8/1996 | ................... 74/557 |
| WO | WO 02/34606 A1 | * | 5/2002 | ................... 74/557 |

* cited by examiner

*Primary Examiner*—Vinh T. Luong
(74) *Attorney, Agent, or Firm*—Lori M. Friedman

(57) ABSTRACT

A device that is ergonomically designed for steering a variety of industrial vehicles is disclosed. The driver may steer the vehicle while keeping his hand flat on the device, which is custom fitted to a particular industrial vehicle. The hand that steers the vehicle is kept flat on the device, allowing the driver of the vehicle to steer it without grasping the steering wheel.

14 Claims, 8 Drawing Sheets

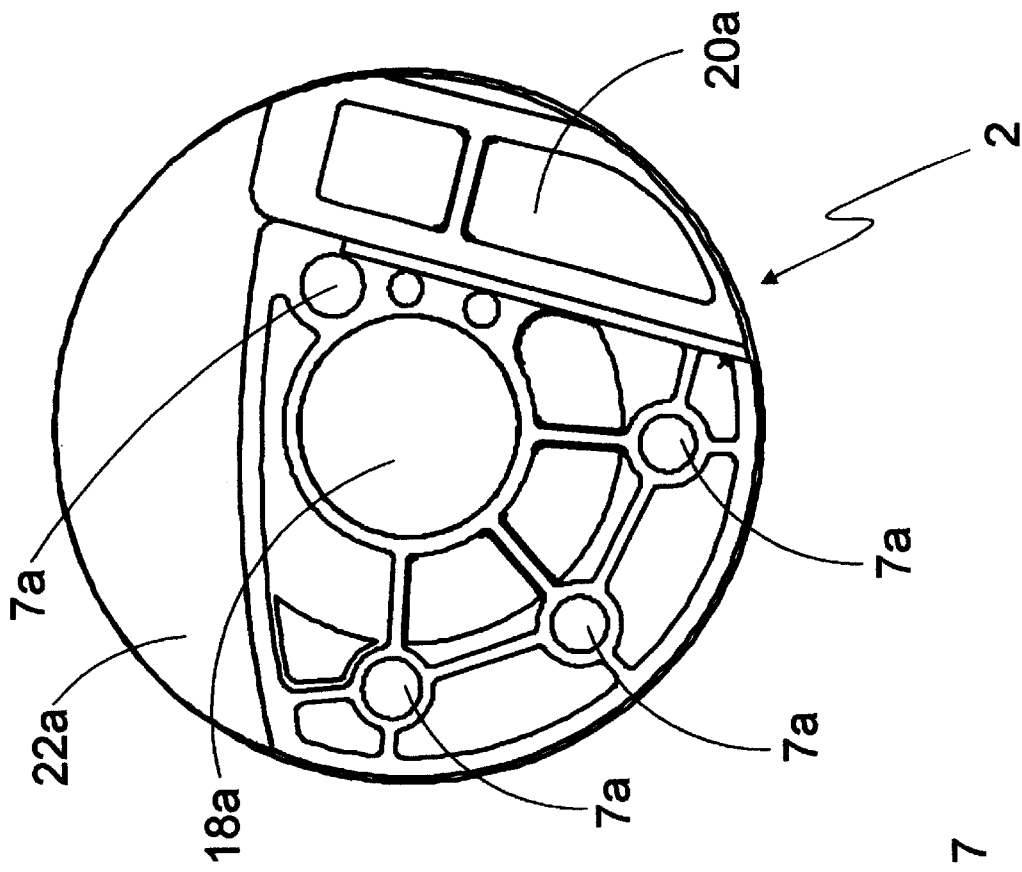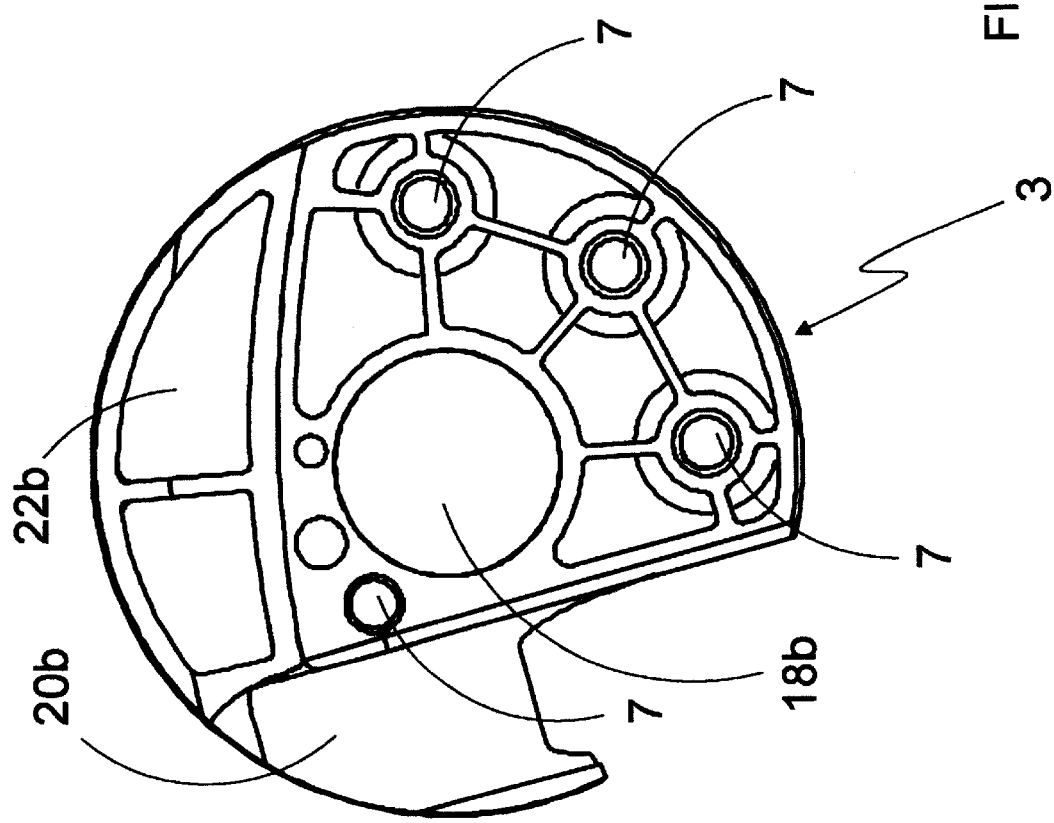
FIG 7

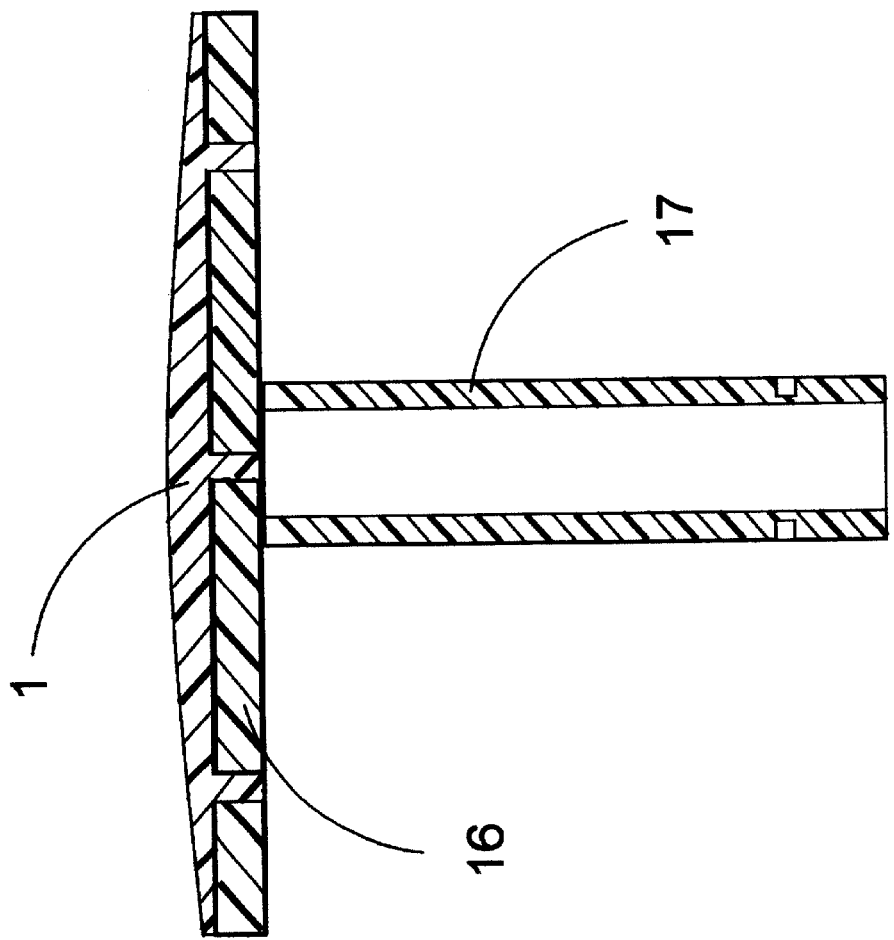

FLAT PROFILE STEERING WHEEL ROTATING DEVICE FOR DRIVER-OPERATED INDUSTRIAL VEHICLES

RELATED PATENT APPLICATIONS

This is a United States continuation-in-part patent application based on patent application Ser. No. 09/680,081 filed on Oct. 5, 2000 now abandoned herein incorporated by reference.

BACKGROUND OF THE INVENTION

1. Filed of the Invention

This invention relates to a device that allows the steering of an industrial vehicle by a driver who steers with the open palm of a hand. More specifically, it relates to a device that is affixed onto a steering wheel of an industrial vehicle thereby providing an ergonomic alternative to the standard steering wheel of a fork-lift truck or other industrial vehicle.

2. Background and Related Art

There is a wide variety of work done and products available that are related to steering wheel aids. Most prior patents concerned with improvements and steering wheel accessories are for automobile steering wheels. The concern in many of these cases is appearance.

The devices of the prior art, including U.S. Pat. No. 5,289,736 to Fujimori are gripped or grasped by the driver to steer a vehicle. In the case of '736, the apparatus is designed to enable a vehicle to be steered by a physically handicapped person. Another example of a steering wheel attachment apparatus is seen in U.S. Pat. No. 5,520,071 to Jones. The apparatus of '071 relates to hand control devices for driving when the driver is handicapped and needs hand controls instead of the usual foot control pedals used when driving an automobile. In both of these examples, the steering wheels must be gripped.

In U.S. Pat. No. 3,776,064, Rose discloses a steering wheel control device that is designed to enable one-handed manipulation of an automotive steering wheel. The device described in '064 is unsafe for the driver of an industrial vehicle as a user's hand is not easily and quickly removed from the grasping position in the event that a quick reflex or response from a driver is required. The current invention allows the driver to easily slide the hand quickly to the steering wheel rim if required.

Due to the popularity of the automobile in today's culture, there are many steering wheel attachments, such as covers or spinners, that are available for drivers. There are many sites on the world wide web, including http://wwwjcwhitney.com that advertise and sell a variety of such things.

In the instant invention, the steering device is designed to relieve the stress and strain on the arms of a forklift driver by allowing him to keep his hand flat on the device, and steer it comfortably. Oftentimes, the driver uses the palm of his hand to steer the forklift as opposed to having to grasp the steering wheel around its rim. In this case, the device supplies the driver a way to steer the vehicle with less applied force since the device of this invention is bearing-loaded and requires less force to steer the vehicle. The rotating pad which the driver controls is cushioned and moves with ease.

Steering a forklift requires training, skill and experience since a loaded forklift weighs hundreds, or even thousands, of pounds more than a car. This makes it harder to steer and stop than a car. On a properly maintained forklift, the steering wheel should move smoothly, with no slack or play; that is, no free movement in the steering wheel before the wheels start to turn.

In many cases, drivers of industrial vehicles such as forklifts experience frequent injuries to their wrists, arms, and shoulders. The Occupational Safety and Health Administration (OSHA) has documented countless examples of such work-related injuries. More specifically, Oregon OSHA forklift recordable injuries from the last five years show that over 12% of all forklift injuries are due to wrist, arm, elbow, and shoulder over-exertion and repetitive motion injuries. As such, it would be of great benefit to many American industries to eliminate the cause of such problems.

Further examples of the problems involved with the difficulty in grasping are related to various wrist, thumb and finger disorders that are common today. There has been much written about carpal tunnel syndrome (CTS). In recent years, reports of repetitive motion injuries have risen dramatically in workplaces around the country. According to the National Institute for Occupational Health and Safety (NIOSH), these problems, frequently termed cumulative trauma disorders, are being reported at all types of workplaces from meat packing plants to newspaper pressrooms.

According to the Bureau of Labor Statistics, disorders associated with repeated trauma account for almost 60% of all occupational illnesses. Of these disorders, carpal tunnel syndrome (CTS) is the condition most frequently reported.

The carpal tunnel is so named from the eight bones in the wrist, called carpals, that form a tunnel-like structure filled with flexor tendons which control finger movement. It also provides a pathway for the median nerve to reach sensory cells in the hand. Repetitive flexing and extension of the wrist may cause a thickening of the protective sheaths which surround each of the tendons. The swollen tendon sheaths, or tenosynovitis, apply increased pressure on the median nerve and produce the painful swelling of CTS.

Although the various causes and symptoms of CTS are not relevant to this patent application, the fact that it is widespread and causes finger pain, tingling and the inability to properly grasp objects is indeed relevant. The discomfort is most often felt in the thumb, index, and ring fingers and is frequently accompanied by the inability to squeeze or grasp things. In advanced cases, the muscle at the base of the thumb atrophies and strength is lost.

CTS is caused by performing job tasks that involve highly repetitive manual actions of the hand that necessitate wrist bending or other stressful wrist postures. The use of vibrating tools, small parts assembly, finishing, sewing, and cleaning are thought to contribute to the occurrence of CTS. Although vehicle steering does not itself appear to cause CTS, it is certain that the grasping action required to steer an industrial vehicle cannot be performed by a worker who suffers from the disorder.

Oftentimes, a person suffering from CTS will have his wrist immobilized in a splint to minimize pressure on the nerves. Such wrist immobilization would not allow the person to perform such duties as steering an industrial vehicle if his hand would have to grasp a steering wheel or a steering wheel knob.

Although carpal tunnel syndrome is the most widely-known wrist disorder, there are numerous other disorders of the wrist that make grasping difficult or impossible. In fact, there is a web site devoted to it: http://www.wristpaincentral.com. Other disorders listed here and in other sites of the web include DeQuervain Tenosynovitis. This disorder is tendonitis of the wrist which causes quite a bit of pain and would prohibit the grasping motion necessary to steer an industrial vehicle without this invention.

Another wrist disorder is known as intersection syndrome. This disorder causes both pain and swelling in the wrist. It affects the thumb side of the forearm where the two muscles of the thumb and forearm cross over, or intersect, two underlying wrist tendons. It is caused by overuse of the wrist and hand from wringing, grasping, turning, and twisting motions which cause irritation of the synovium and tendons. Reported cases involve repetitive and/or heavy use of the wrist.

Furthermore, the steering device of this invention, when properly attached to the steering wheel of an industrial vehicle, has a larger area on which the driver's hand can rest, adding to the ease of steering and comfort. In this way, the angle of the wrist is at a neutral position and the steering wheel does not have to be grasped by the driver's hand to steer the vehicle.

An additional safety feature of the device of this invention is that its location on the lowest part of the industrial steering wheel discourages several common workplace accidents related to steering industrial vehicles. While steering the vehicle, ties or other articles of clothing may get caught around a steering wheel, leading to loss of control of the vehicle by the driver. Hands and fingers have been broken by the protruding nature of prior art steering devices.

The steering device of the instant invention does not substantially protrude above the steering wheel, thus making it a safer one to operate. The device does not substantially protrude above the steering wheel because it is custom-fit to a particular industrial vehicle's steering wheel. More specifically, if the industrial vehicle is a forklift, each forklift manufacturer designs a particular forklift steering wheel specifically for each of their forklift models.

For instance, the steering wheel design of HYSTER® is different than the steering wheel design of TOYOTA® which is different than the steering wheel design of NISSAN® and so forth. In this invention, each steering device has to be specifically designed for a particular forklift manufacturer's vehicle. Since each steering device is designed for a particular forklift steering wheel, its design has been optimized for that particular wheel so that it does not substantially protrude above the steering wheel. The prior art is either attached to the steering wheel rim or replaces one of the steering wheel spokes and it is not custom fit to a particular vehicle manufacturer.

The current invention is constructed in such a way that it fits into the corner of a steering wheel where the spoke meets the rim. It attaches to both the steering wheel rim and steering wheel spoke simultaneously so that it does not protrude substantially above the steering wheel rim and yet provides a very rigidly supported device.

The clamping area of the steering device that attaches to the rim and spoke are the exact shape of that part of the steering wheel. Once the steering device has been put onto a steering wheel, it has the appearance of being an integral part of the steering wheel due to its custom fit design. The prior art has an appearance of being an add-on to an existing steering wheel.

SUMMARY OF THE INVENTION

The device of this invention is an ergonomically designed steering wheel aid whose design allows the steering of an industrial vehicle while the driver keeps his hand flat on the device. Unlike prior steering devices, the one of this invention is custom fitted to a particular industrial vehicle. Once fitted for a particular vehicle, any driver of the vehicle may use it correctly and comfortably without further customization.

Since the amount of disabling industrial wrist injuries from carpal tunnel syndrome and the like is on the rise, this invention is seen as a major advancement in industrial health and safety.

BRIEF DESCRIPTION OF THE DRAWINGS

Comparative

FIG. 7 is a plane view of the top and lower sections showing where the screw inserts and holes are located on the steering device.

FIG. 8 is a side section view of the rotating pad, base and shaft.

DEFINITIONS

In this invention, 'industrial vehicles' will mean forklift trucks, heavy equipment used in industry, tractors, construction equipment, front-end loaders, road resurfacing equipment, agricultural equipment, tug boats, commercial road vehicles, and luggage carts used in airports.

In this invention, the term 'spinner' will mean a steering knob of the prior art that is grasped by a driver and is sold as an aftermarket addition to automobile steering wheels.

DETAILED DESCRIPTION OF THE PREFERRED EMBODIMENTS

Figure 1:
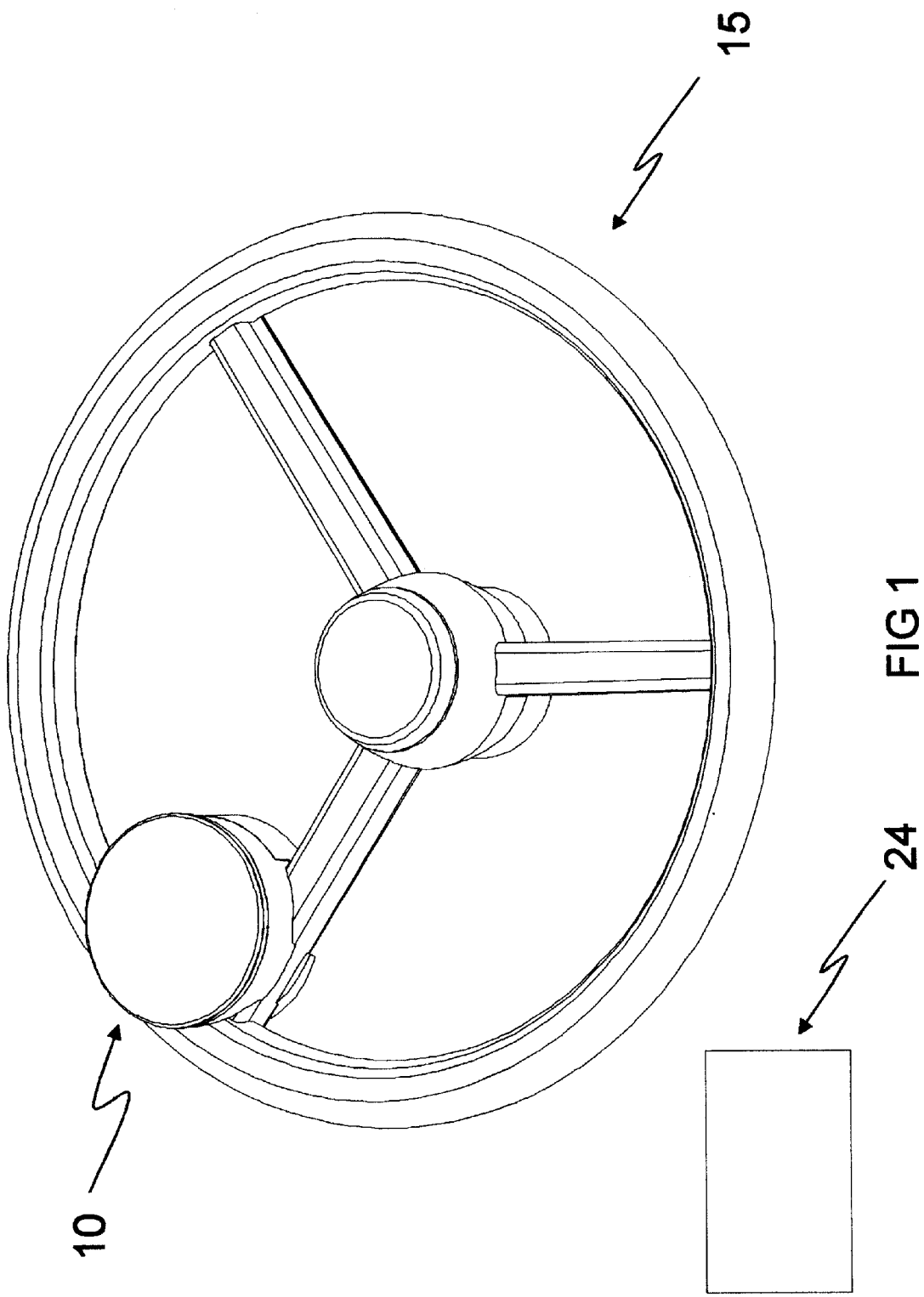
FIG. 1 is a perspective view of the steering wheel device of this invention and a labeled rectangular box representing an industrial vehicle in which a device of this invention is installed.
Figure 2:
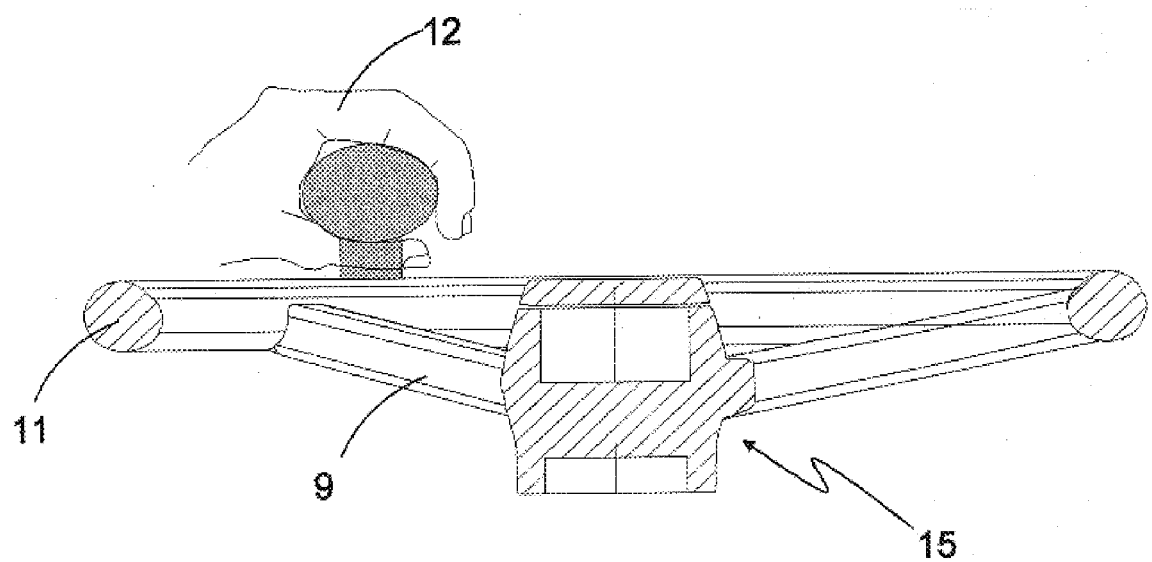
FIG. 2 is a side section view showing a typical prior art steering wheel spinner knob that must be grasped by the driver's hand to steer the vehicle.
Figure 3:
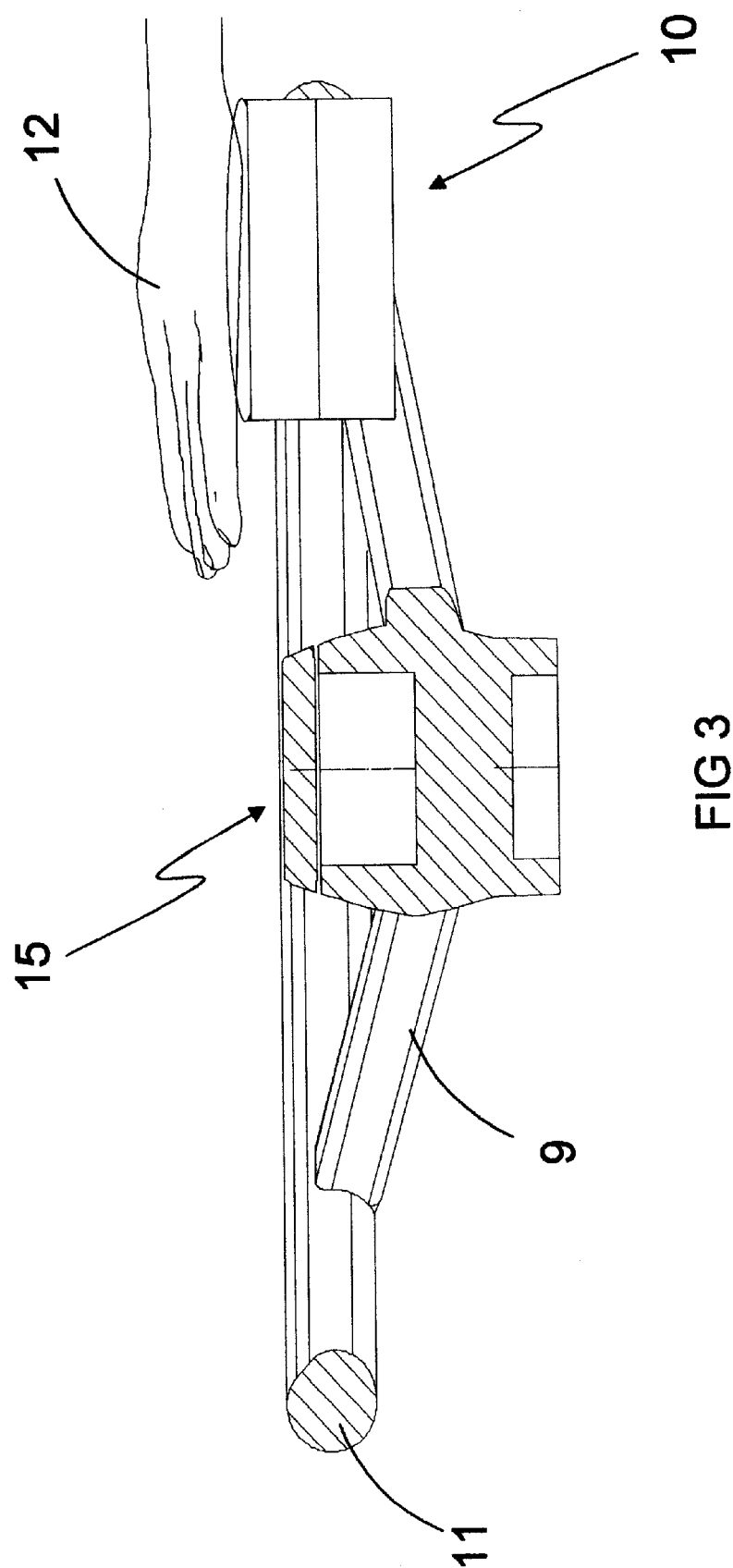
FIG. 3 is a side section view of a steering wheel device of this invention showing the driver's hand laying flat on it to steer an industrial vehicle.

FIG. 1 illustrates how the steering device 10 of this invention fits onto an industrial vehicle steering wheel 15. The present invention is designed to be used with the flat palm of the driver's hand 12 as is illustrated in FIG. 3. Comparative FIG. 2 illustrates a typical prior art steering device in which the hand 12 must be used in a grasped position rather than a flat position. The present invention relates to a steering wheel rotating device 10 which includes a rotating pad 1, a top section 2, and a lower section 3.

Figure 4:
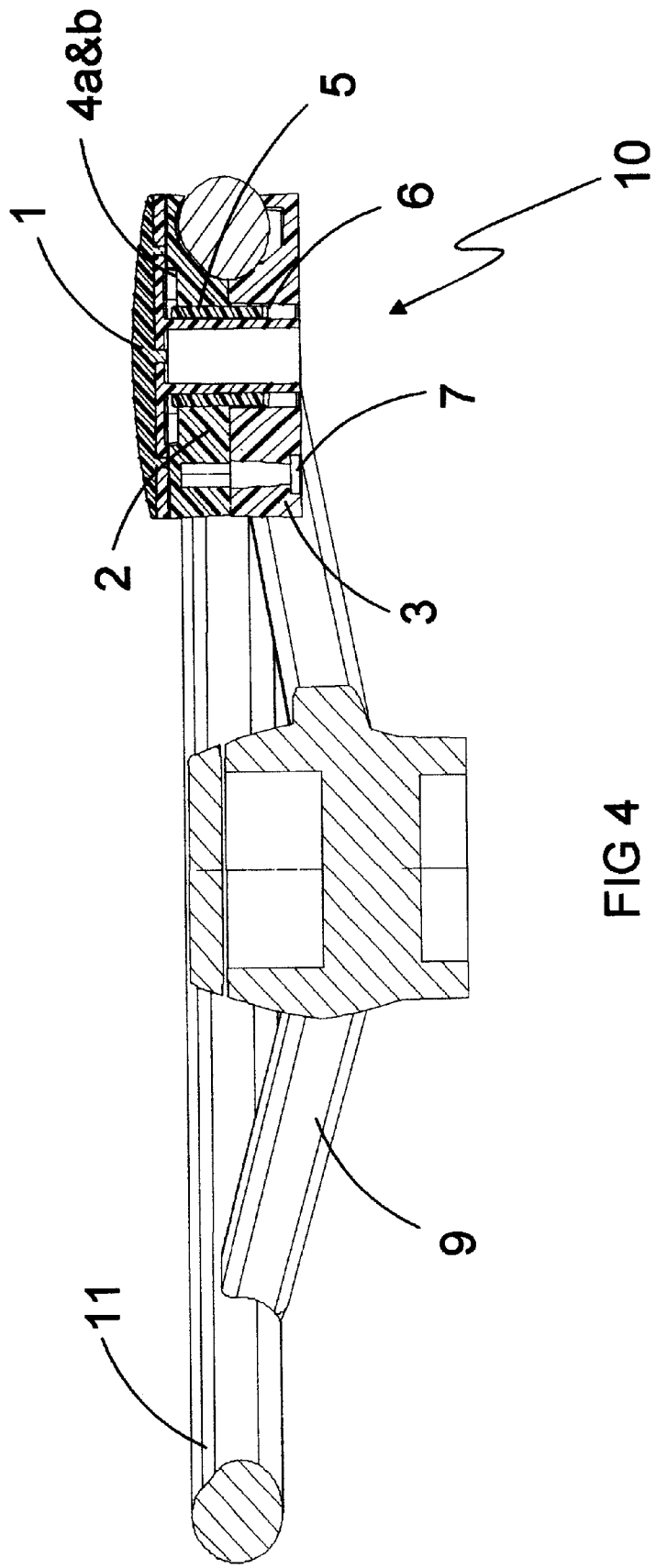
FIG. 4 is a side section view of the steering device illustrating the components of construction on a steering wheel.
Figure 5:
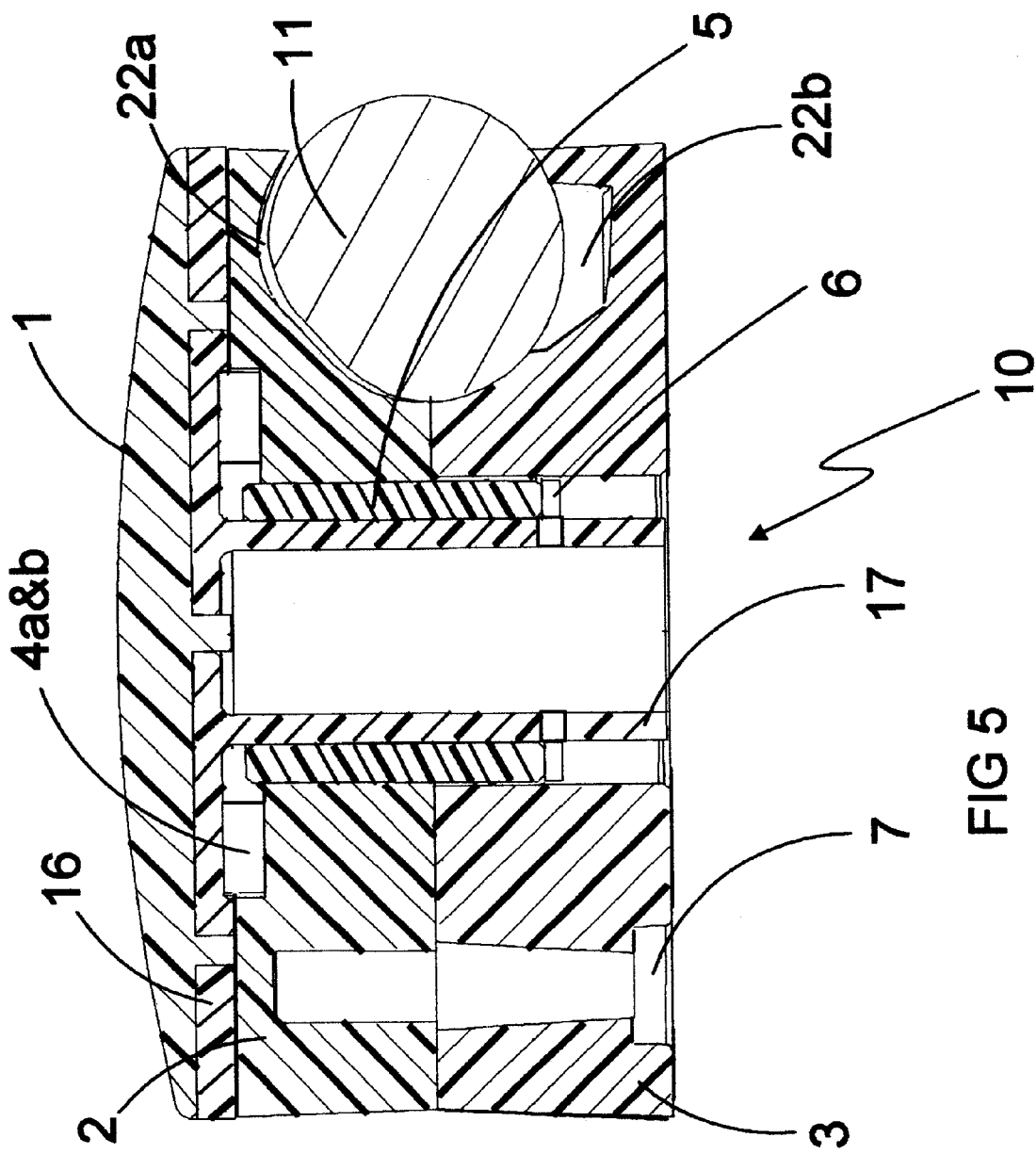
FIG. 5 is a close up side section view of the steering device of this invention illustrating its components.
Figure 6:
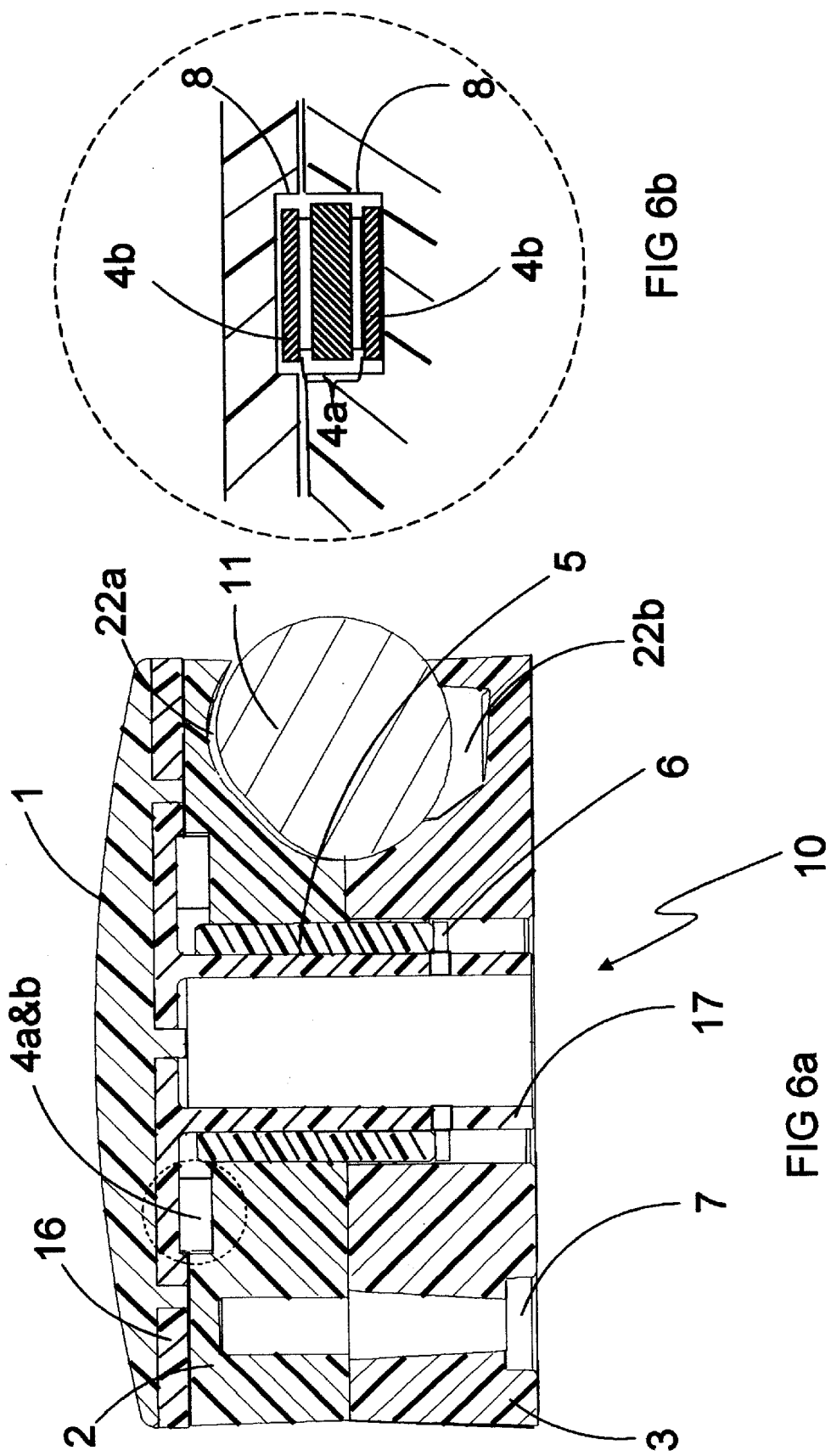
FIG. 6a is a side section view of the steering device showing the details of the thrust bearing area of the steering device
FIG. 6b is a side cross section of one side of the thrust bearing and recessed area in the top section.

As seen in FIGS. 4, 5, and 6, the top section 2 and lower section 3 consist of multiple components 4a, 4b, 5, 6, 7 connected together to form a clamp-like steering wheel rotating device 10. Unlike steering devices of the past, this device 10 clamps around both the steering wheel rim 11 and a steering wheel spoke 9. This allows the device 10 to sit lower into the interior of a steering wheel 15 at the intersection of the spoke 9 and the rim 11 as shown in FIGS. 3 and 4.

The top section 2 and lower section 3 have internal dimensions corresponding to the sectional dimensions of a rim 11 and spoke 9 section of a specific industrial vehicle steering wheel 15. Both the top section 2 and the lower section 3 are circular and measure approximately 3 inches in diameter. They are preferably made of a plastic material. Since the device 10 is customized for a particular industrial steering wheel 15, the appearance concerning color and/or particular company logo may be determined by the end user.

The steering device 10 of this invention is not universal to all industrial vehicles, or a "one size fits all" design. A different top section 2 and lower section 3 are required for each design of industrial steering wheels 15. As illustrated in FIG. 7, the area of 22a of the top section 2 and the area of 22b of the lower section 3 will have a different dimension for each steering wheel rim 11 design. Correspondingly, the area of 20a of the top section 2 and the area of 20b of the lower section 3 will have a different dimension for each steering wheel spoke 9 design. For a particular industrial vehicle steering wheel 22a and 22b are complementary sized and will fit together on the rim 11 and spoke 9 of the vehicle's steering wheel 15.

To customize the device of this invention 10 for particular steering wheels, the top section 2 has a plurality of internally threaded screw inserts 7a to accept for a plurality of metal screws (not shown). Referring to FIG. 7, the lower section 3 has a plurality of countersunk screw holes 7 to accept a plurality of metal screws which line up with corresponding internally threaded screw inserts 7a in the corresponding top section 2. The top section 2 and lower section 3 are thereby tightened together with metal screws to form a clamp-like member around the rim 11 and spoke 9 of a particular industrial vehicle steering wheel 15 with the use of a Phillips head screwdriver (not shown).

The top section 2 has a thrust bearing 4a and bearing races 4b which allow the rotating pad 1 to swivel freely and smoothly. The rotating pad 1 rides on the thrust bearing 4a and the thrust bearing 4a rides on the top section 2. The rotating pad base 16 and the top section 2 has a corresponding recessed area 8 for the thrust bearing 4a and bearing races 4b to occupy as shown in FIG. 6b. The rotating shaft 17 of the rotating pad 1 goes through the center of the inner bore 18a in the top section 2 and the inner bore 18b lower section 3.

A sleeve bearing 5 provides support and low friction surface for the rotating pad shaft 17. The sleeve bearing 5 fits into the diameter of the inner bore 18a of the top section 2 and inner bore 18b lower section 3. The sleeve bearing 5 is the length of the inner bore 18a of the top section 2 plus one half the length of the inner bore 18b of the lower section 3. This prevents either the sleeve bearing 5 or the rotating pad shaft 17 from protruding beyond the inner bore 18b of the lower section 3. A retaining ring 6 is used to prevent the rotating pad shaft 17 from pulling out of the sleeve bearing 5.

The rotating pad 1, as shown in FIG. 8, consists of two sections which are a rotating pad base 16 with a corresponding rotating pad shaft 17 and the rotating pad base 16 that is covered with a molded, soft, cushioned material such as foam rubber, urethane rubber, gel-filling or the like. The materials out of which the rotating pad 1 can be made should have a durometer hardness ranging from about 10 to about 100. The rotating pad 1 is the size of a palm of the hand 12 of an average user, the size of which may range from about 10 to about 15 square inches. The rotating pad 1 has a surface that is slightly convex in shape. Rotating pad 1, covered with the soft, cushioned material, is able to absorb vibration from the steering wheel 15 and prevent slippage between the palm 12 and the rotating pad 1.

The steering wheel device 10 of this invention is pre-assembled and will be supplied to the company making a variety of industrial vehicles, such as forklifts. A user needs only put the lower section 3 underneath a steering wheel rim 11 and spoke 9 which accommodates the shape of the steering wheel rim 11 and spoke 9. Then, the screws which are tightened to fasten the top section 2 and the lower section 3 together which embrace the steering wheel rim 11 and spoke 9. To dismount the steering wheel device 10 from the steering wheel 15, the screws 7 are loosened, the lower section 3 is removed, and then the entire steering wheel rotating device 10 is removed in two components, which are the top section 2 and the lower section 3.

As has been stated, each industrial vehicle for which the device of this invention is used needs to have a device that specifically fits the particular vehicle. In this invention, each steering device has to be specifically designed for a particular industrial vehicle. If the industrial vehicle is a forklift, the specifics of each forklift manufacturer must be considered. Such vehicles are made by such companies as HYSTER, YALE, TOYOTA, NISSAN, and CATERPILLAR. Since each steering device is designed for a particular forklift steering wheel, its design has been optimized for that particular wheel so that it does not substantially protrude above the steering wheel.

Table 1, below, is a sample of the kinds of data that are considered when designing a device of this invention for a particular forklift.

TABLE 1

| Manufacturer Name | Model No. | Steering Wheel Rim (inches) | Steering Wheel Spoke (inches) |
|---|---|---|---|
| HYSTER ® | H50XM | 1.068 | 0.770 |
| Toyota TOYOTA ® | 7FGCU25 | 1.133 | 1.931 |

The flat surface of the steering wheel device 10 provides the steering wheel 15 with low profile aid that does not interfere with a drivers hand 12 or arm in the event of sudden or unexpected steering wheel 15 movements. It also prevents the driver's clothing from accidentally being caught in the steering wheel 15 or rotating device 10. Prior steering devices do not have this advantage of flatness as does the instant invention.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A device that aids in steering an industrial vehicle comprising
   a) a top section with a rotating pad that has a substantially flat top surface and has underneath a thrust bearing and a plurality of threaded holes which are set to receive a plurality of fasteners which fit into a plurality of threaded holes for fastening to a lower section, said top section also containing a shaft and an inner bore;

b) a lower section that has an inner bore and a plurality of countersunk screw holes that fit the threaded holes of the top section whereby the top and lower sections are fastened together;

c) a sleeve bearing that is present to provide support and low friction between the two sections and which fits into the bores of the top and lower sections, and d) a thrust bearing and bearing races in the top section on which a rotating pad rests and for which there is a corresponding recessed area in the lower section which allow the shaft of the rotating pad to move through the center of the inner bore of the top section and the inner bore of the lower section easily when moved by a flat palm of a driver's hand which allows the driver to steer the industrial vehicle with a flat, non-grasping hand.

2. The device of claim 1 wherein the length of the sleeve bearing is equal to the length of the inner bore of the top section plus one half the length of the lower section.

3. The device of claim 1 wherein a retaining ring is present on the rotating pad shaft to prevent the rotating pad shaft from coming out of the sleeve bearing.

4. The device of claim 1 wherein the rotating pad has a shaft that goes through the center of the inner bore in the top section and the lower section.

5. The device of claim 1 wherein the number of threaded screw holes present in the top and corresponding countersunk internally threaded screw inserts in the lower section ranges from 3 to 5.

6. The device of claim 1 wherein the vehicle being steered is selected from the group consisting of forklift trucks, heavy equipment used in industry, tractors, construction equipment, front-end loaders, road resurfacing equipment, agricultural equipment, tug boats, commercial road vehicles, and luggage carts used in airports.

7. The device of claim 1 wherein the rotating pad is made of material that is selected from the group consisting of rubber, foam, urethane and gel.

8. The device of claim 7 wherein the material comprising the rotating pad has a durometer hardness which ranges from 10 to 100.

9. The device of claim 1 wherein the top and lower sections, when assembled on a spoke and rim of the steering wheel, do not substantially protrude above said steering wheel.

10. The device of claim 1 wherein the industrial vehicle to which it is attached is steered ergonomically by a driver who keeps his hand flat on the device and rotates the top section of the device with said flat hand and who guides the vehicle safely without the need for grasping the steering wheel with his fingers.

11. A device which custom-fits a steering wheel rim and spoke of an industrial vehicle that includes a top section with a rotating pad that fits the palm of a driver's hand, which is connected to a lower section; wherein both top and lower sections contain a shaft and bore which contain a sleeve bearing and a thrust bearing in the top section which allows the swivel movement of the palm of the driver's hand to steer the vehicle safely without the need to grasp said steering wheel with his fingers.

12. The device of claim 11 wherein attachment to the steering wheel rim and spoke is at a corner where a spoke of the steering wheel meets the rim of said steering wheel resulting in a cohesive unit that the driver of the vehicle can safely, ergonomically, and comfortably steer the industrial vehicle.

13. The device of claim 11 wherein the appearance of the device on a steering wheel is that of a custom-fit by minimal protrusion above said steering wheel.

14. The device of claim 11 wherein the industrial vehicle being steered is selected from the group consisting of forklift trucks, heavy equipment used in industry, tractors, construction equipment, front-end loaders, road resurfacing equipment, agricultural equipment, tug boats, commercial road vehicles, and luggage carts used in airports.

* * * * *